(12) United States Patent
Neitzke

(10) Patent No.: US 8,815,368 B2
(45) Date of Patent: Aug. 26, 2014

(54) COMPOSITE SHEET HAVING A CORE HAVING END WALLS AND A MAT WITH FIBERS

(76) Inventor: Mark Neitzke, Waterford, MI (US)

(*) Notice: Subject to any disclaimer, the term of this patent is extended or adjusted under 35 U.S.C. 154(b) by 404 days.

(21) Appl. No.: 12/705,804

(22) Filed: Feb. 15, 2010

(65) Prior Publication Data

US 2011/0200785 A1 Aug. 18, 2011

(51) Int. Cl.
*B29C 70/16* (2006.01)
*B29C 70/22* (2006.01)
*B29C 70/56* (2006.01)

(52) U.S. Cl.
USPC ............... 428/116; 428/297.4; 428/297.7

(58) Field of Classification Search
CPC ....................................... B29C 70/56
USPC ........... 428/116, 131, 297.7, 304.4, 369, 373, 428/376; 156/290, 292; 52/801.1; 181/292, 181/293
See application file for complete search history.

(56) References Cited

U.S. PATENT DOCUMENTS

| | | | |
|---|---|---|---|
| 3,887,739 A * | 6/1975 | Kromrey | ................ 428/116 |
| 3,966,522 A | 6/1976 | Hatch et al. | |
| 5,315,820 A | 5/1994 | Arnold | |
| 5,993,941 A | 11/1999 | Vasiliev et al. | |

FOREIGN PATENT DOCUMENTS

| | | |
|---|---|---|
| EP | 0038746 A1 | 10/1981 |
| EP | 1950034 A1 | 7/2008 |
| WO | WO 98/42901 | 10/1998 |

OTHER PUBLICATIONS

International Search Report for PCT/US2011/024681.

* cited by examiner

*Primary Examiner* — David Sample
*Assistant Examiner* — Nicholas W Jordan
(74) *Attorney, Agent, or Firm* — Vivacqua Law, PLLC; Pete N. Kiousis

(57) ABSTRACT

A composite sheet and a method of making a composite sheet. A core having end walls is provided. Continuous fibers or a continuous fiber mat is secured to the core such that the continuous fibers align with the end walls of the core.

12 Claims, 8 Drawing Sheets

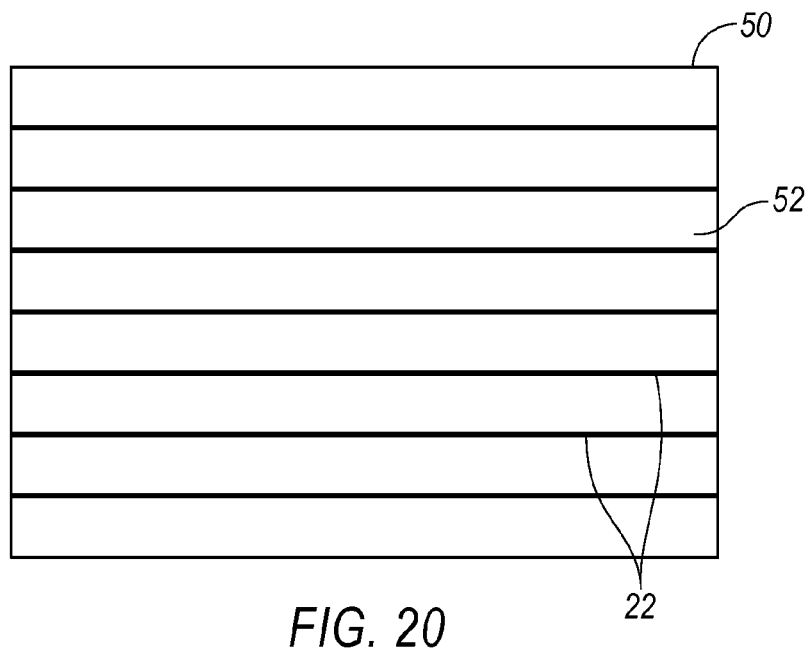
FIG. 20
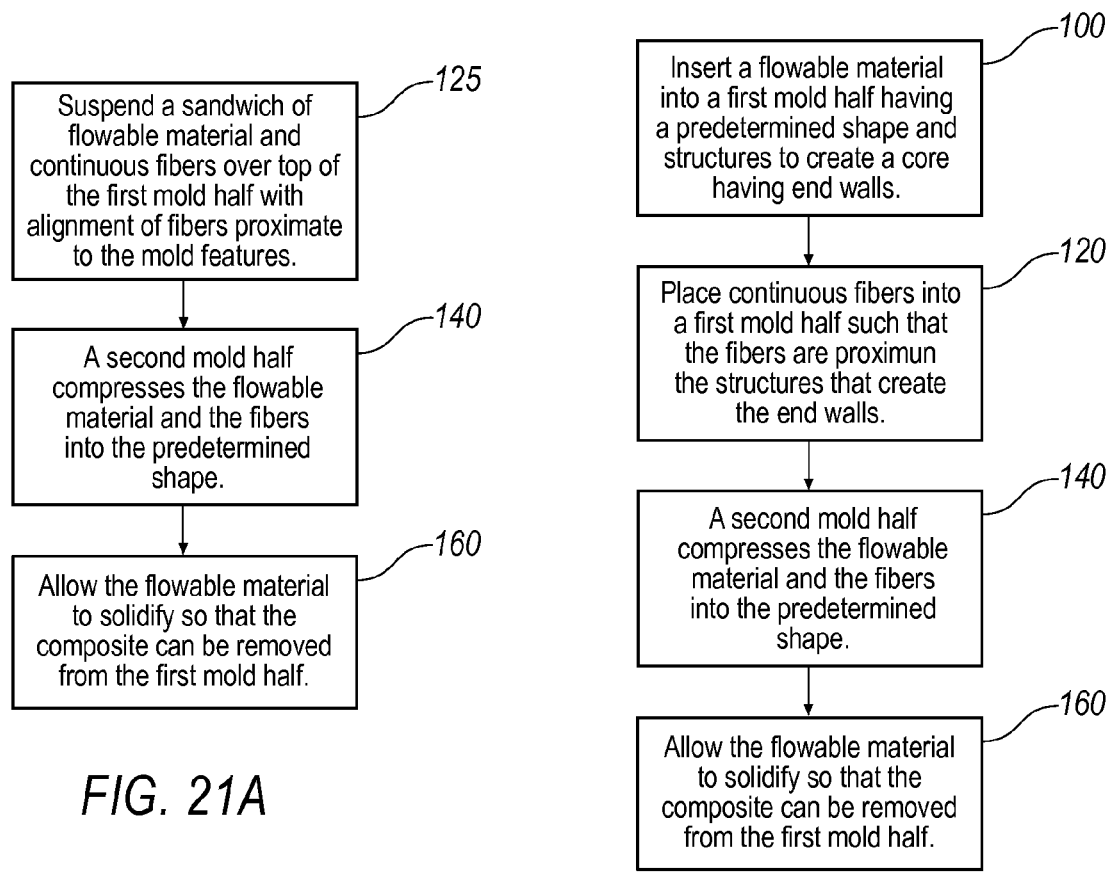
FIG. 21A
FIG. 21B

COMPOSITE SHEET HAVING A CORE HAVING END WALLS AND A MAT WITH FIBERS

BACKGROUND OF THE INVENTION

1. Field of the Invention

The present invention relates to a composite comprising a core having end walls and continuous fibers which are oriented along the end walls.

The present invention further relates to a composite comprising a core having end walls and continuous fibers which are oriented along the end walls where the continuous fibers are placed in tension prior to or simultaneously to being secured to the core.

The present invention further relates to a composite wherein the continuous fibers are impregnated with resin before or simultaneously with being secured to the core.

The present invention also relates to methods of making such composites.

2. Description of Background Art

Many composite products exist that use lightweight cores and high strength skins to create structural panels or monocoque shapes. The core has traditionally been manufactured out of a variety of materials such as wood, plastic, foam, metal, card board and the like depending on its end use. In some cases, the core is manufactured as an open ended cellular pattern having end walls. The pattern may be, for example, a biaxial, circular, honeycomb or flat pattern. FIGS. 1, 2, 3 and 4 show various prior art core configurations including tubes structures, honeycomb structures, closed cell foam and corrugated paper, respectively. FIGS. 1, 2 and 4 show examples of open ended cores.

Fibers are typically placed on top of this core to add strength to the composite as is also well known in the art. Fibers have traditionally been made out of glass, carbon, metal, thermoplastic and other well known materials and may be impregnated within a resin to form a flexible or rigid mat for easier handling. The fibers have traditionally been oriented either randomly over the core or in an orderly arrangement form over the core. However, even in cases where the core has an open ended cellular pattern, there has never been an attempt to orient the fibers along the end walls.

FIGS. 5, 6 and 7 show various fiber and fiber mat configurations including a woven fabric, unidirectional continuous fibers and chopped fibers, respectively. FIG. 8 shows a sheet which may be secured to the core and is void of fibers.

Processes for assembling such prior art composites are also well known. The core and fibers or fiber mat may be layered either by hand, in a compression mold, or vacuum forming, for example. Alternatively, an injection molding process may be used wherein the fibers or fiber mat is inserted into a mold half prior to the core being manufactured.

The fibers or fiber mat may be secured to the core using a variety of methods such as heat from the molding process, added heat, or an adhesive.

In many cases, fiber mat is inserted into the mold as a flat sheet and, if the mold has a predetermined shape, the fibers in the fiber mat are formed to match the predetermined shape. Depending on the actual predetermined shape, some of the fibers may be stretched taught and some of the fibers may be bent or folded. Fibers add the most strength and rigidity to the composite when placed in tension.

In other cases, the fiber mat and/or the core may be preformed to match the mold surface. Sometimes care is taken to ensure that the fibers composing the mat are made to be taut during this performing process.

While in general, composite materials are stronger and/or lighter than their traditional counterparts, there exists opportunity for further optimization. In many examples, the fibers are merely chopped and placed in the fiber mat. To increase the strength of the composite, either more fibers or more resin are added to the fiber mat or the core is strengthened.

In cases where a fibrous cloth or an ordinary arrangement of the fibers are placed over an open ended cellular core having end walls, the fibers randomly overlay and intersect the end walls. Further, when such a composite is placed under a bending force, the fibers may interrupt the visible surface of the composite between the end walls of the core, and at that location they create a failure in its ability to carry a load. To combat this failure propagation, resin or fiber thickness of the skin is increased.

Sometimes panel loads are relatively low and hence the weight of the composite is a primary objective. Attempts to keep the core and wall spacing wide and the skin thickness thin are negated by the fiber deflection and buckling when they are not supported by an end wall.

Accordingly, a need exists for an optimized composite design that can yield better strength and/or weight.

BRIEF SUMMARY OF THE INVENTION

The present invention is directed to a composite comprising an open ended core having at least one end wall and at least one continuous fiber. The at least one continuous fiber is oriented along the at least one end wall of the core and is secured to the core.

The present invention is also directed at a composite comprising an open ended cellular core having end walls in a bi-axial pattern. A skin having impregnated continuous fibers oriented in a bi-axial pattern, the skin secured to at least one side of the core. The impregnated fibers are substantially aligned with the end walls of the core when the skin is secured to the core.

The present invention is further directed at a method of making a composite comprising inserting a flowable material into a first mold half having a predetermined shape and structures to create a core having end walls. Continuous fibers are placed into the first mold half such that the continuous fibers are oriented proximate the structures that create the end walls. The flowable material is then allowed to solidify so that the composite can be removed from the first mold half.

The present invention is further directed at a method of making a composite comprising providing a first mold half having structures to create a core having end walls. Continuous fibers are placed in the first mold half and/or second mold half such that the continuous fibers are oriented with the end wall structure. A second mold half is provided having structures to create a core having end walls. The second mold half and the first mold half are compressed. Then, a flowable resin or material is injected between the two mold halves. Also, the continuous fibers and flowable resin can be positioned in between the two mold halves prior to them being brought together.

BRIEF DESCRIPTION OF THE DRAWINGS

FIG. 20 is a fiber mat of the present invention;

FIG. 21A is a flow chart of a molding process of the present invention;

FIG. 21B is a flow chart of another molding process of the present invention;

DETAILED DESCRIPTION OF THE INVENTION

The following description of the preferred embodiments are merely exemplary and in no way are intended to limit the invention, its application, or uses.

Figure 18:
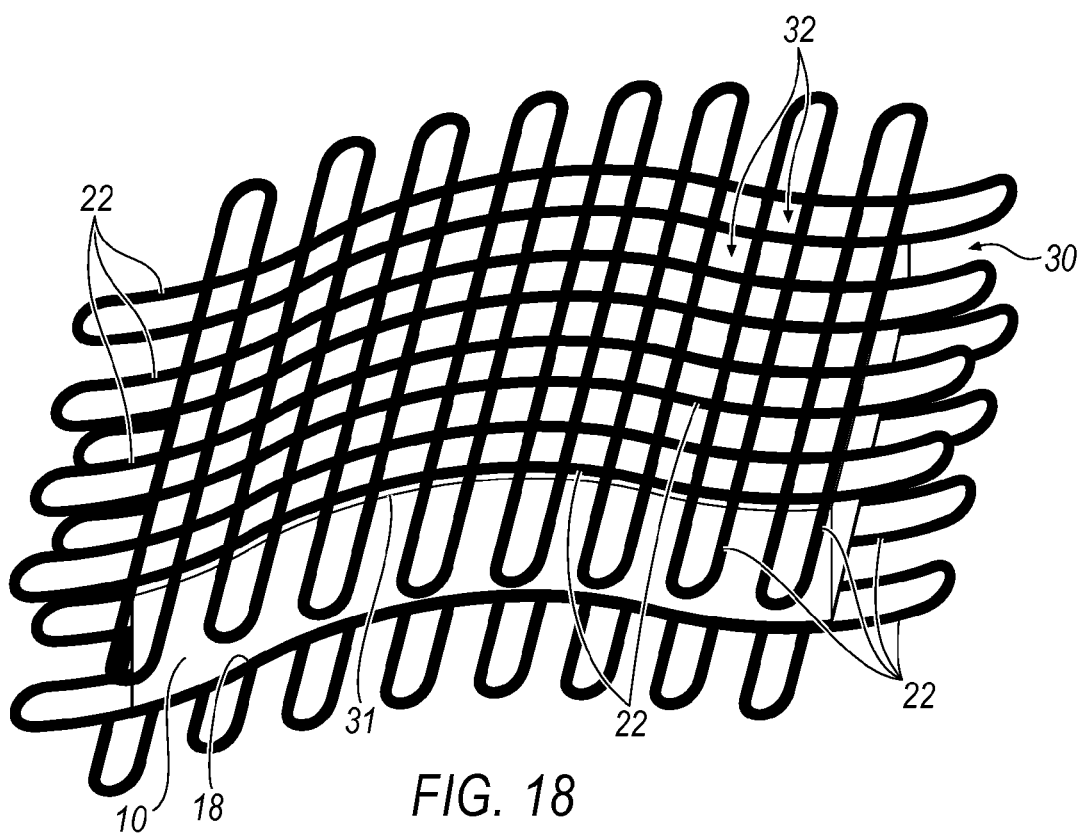
FIG. 18 is a front perspective view of a composite of the present invention.

As shown in FIG. 18, the composite 10 of the present invention is comprised of at least two distinct components: a core 10 and fibers 22. The core 10 is generally a low strength material, but its thickness provides the composite with high bending stiffness with overall low density while the fibers 22 add stiffness and strength in tension. The combination creates a material that is generally either stronger or lighter or both than a panel made of out just the core material.

The composite 10 of the present invention can be used in any application where a composite sheet or even a single material sheet may be used such as docks, vehicle body panels, aircraft components, and structural components. The particular structure of the composite does not limit its use. The composite 10 may have a predetermined shape 31 to accommodate its end use.

Figure 9:
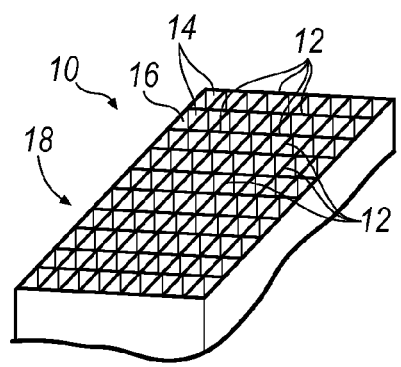
FIG. 9 is a top perspective view of a first core pattern of the present invention.

Referring now to the drawings where like numerals refer to like structures, and in particular to FIG. 9, the core 10 on the present invention comprises a plurality of end walls 12 in a bi-axial pattern. The core 10 of FIG. 9 may be open ended where a space 14 may extend from the top face 16 to the bottom face 18. Alternatively, the bottom face 18 may not be open ended. For structural, aesthetic or manufacturing purposes, the bottom face may be a solid face. As another alternative, the top face 16 and bottom face 18 may both be open ended, but a solid layer (not shown) exists between the top face 16 and bottom face 18. The term end walls includes the end of structures that are near one of the top 16 or bottom faces 18. In the Figures, the end walls are shown as the end of vertical walls. Yet another alternative is a checkerboard open and closed pattern (not shown) on the top and bottom surfaces such that an open end on one surface correlates with a closed surface on the other end.

Figure 10:
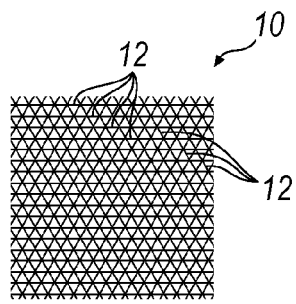
FIG. 10 is a top view of a tri-axial core pattern of the present invention.
Figure 11:
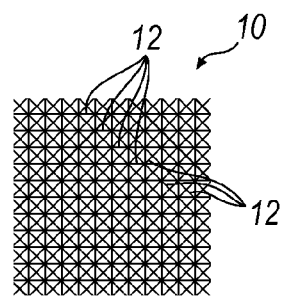
FIG. 11 is a top view of a quadra-axial core pattern of the present invention.
Figure 12:
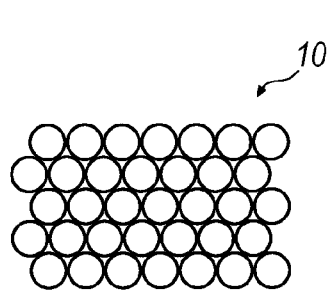
FIG. 12 is a top view of a serpentine bi-axial core pattern of the present invention.

Other core patterns may be used depending on structural, aesthetic or manufacturing requirements. For illustrative purposes only, and not to limit the invention, three different core patterns are shown in FIGS. 10-12. FIG. 10 shows a core 10 wherein the end walls 12 are formed in a tri-axial pattern. FIG. 11 shows a core 10 wherein the end walls 12 are formed in a quadra-axial pattern. FIG. 12 shows a core 10 wherein the end walls 12 are formed in a serpentine bi-axial or tubular pattern wherein the pattern is formed by joining tubes to one another.

The particular core material is not important to this invention and can be made out of any suitable material which will depend largely on the particular application. Common core materials include wood, plastic, metal and card board.

Figure 1:
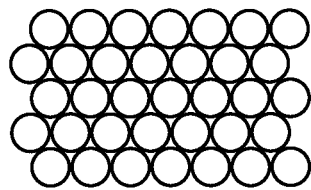
FIG. 1 is a top view of a known core pattern.
Figure 2:
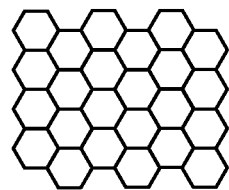
FIG. 2 is a top view of a second known core pattern.
Figure 3:
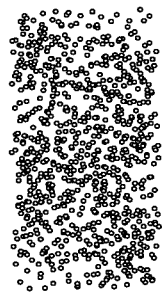
FIG. 3 is a top view of a third known core pattern.
Figure 4:
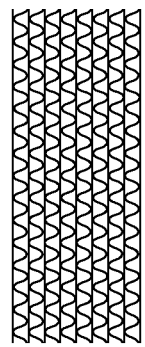
FIG. 4 is a top view of a fourth known core pattern.
Figure 5:
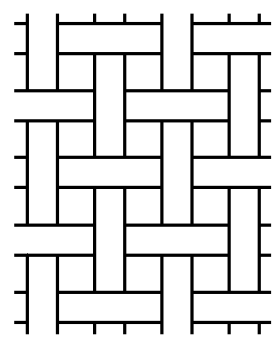
FIG. 5 is a top view of a known fiber pattern.
Figure 6:
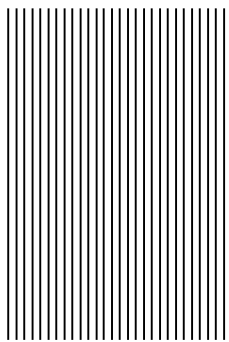
FIG. 6 is a top view of a second known fiber pattern.
Figure 7:
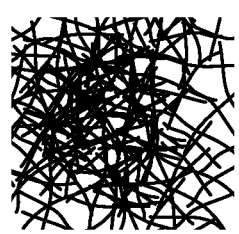
FIG. 7 is a top view of a third known fiber pattern.
Figure 8:
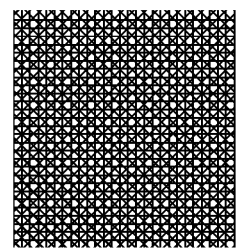
FIG. 8 is a top view of a known sheet.
Figure 13:
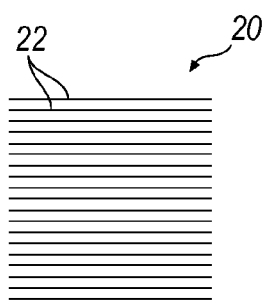
FIG. 13 is a top view of a unidirectional fiber pattern of the present invention.
Figure 14:
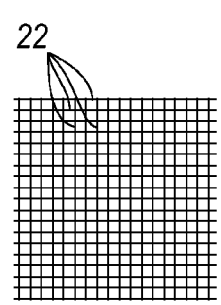
FIG. 14 is a is a top view of a bi-axial fiber pattern of the present invention.

The fibers in this invention are continuous fibers unlike the chopped fibers shown in FIG. 7. By continuous fibers it is meant fibers that continue substantially across a portion of a top or bottom face of the core as opposed to chop fiber and other types of discontinuous fibers. The term continuous fiber also encompasses a single fiber strand or multiple fiber strands bundled together. FIG. 13 depicts one example of a continuous fiber pattern 20 showing continuous fibers 22 aligned in an axial pattern which may align with the bi-axial core pattern depicted in FIG. 9, the tri-axial pattern of FIG. 10 or the quadra-axial pattern of FIG. 11. It is not critical that continuous fibers 22 align with every series of end walls or even every end wall 12 of a particular core pattern.

The continuous fibers 22 may, for example, be at the surface of the end walls 12, may be below the surface of the endwall 12, or may be below intersecting continuous fibers 22. It is not necessary that the continuous fiber be at the extreme end of an end wall 12.

Figure 15:
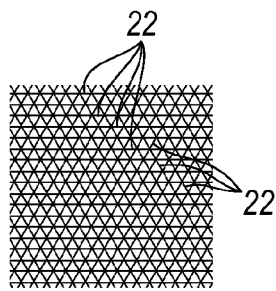
FIG. 15 is a view of a tri-axial fiber pattern of the present invention.
Figure 16:
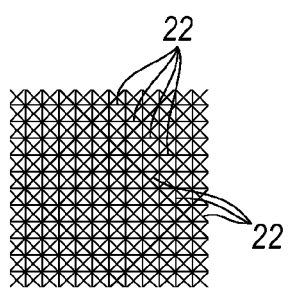
FIG. 16 is a top view of a quadra-axial fiber pattern of the present invention.
Figure 17:
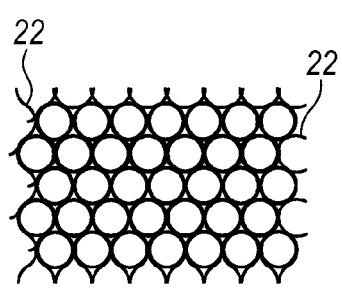
FIG. 17 is a top view of a serpentine bi-axial fiber pattern of the present invention.

FIGS. 15, 16 and 17 depict tri-axial, quadra-lateral and serpentine bi-axial fiber patterns which align with respectively, the tri-axial, quadra-lateral and serpentine bi-axial core pattern of FIGS. 10, 11 and 12. Other fiber patterns are possible which would align with comparable core patterns such that at least one continuous fiber 22 would align with at least one end wall 12.

Figure 19:
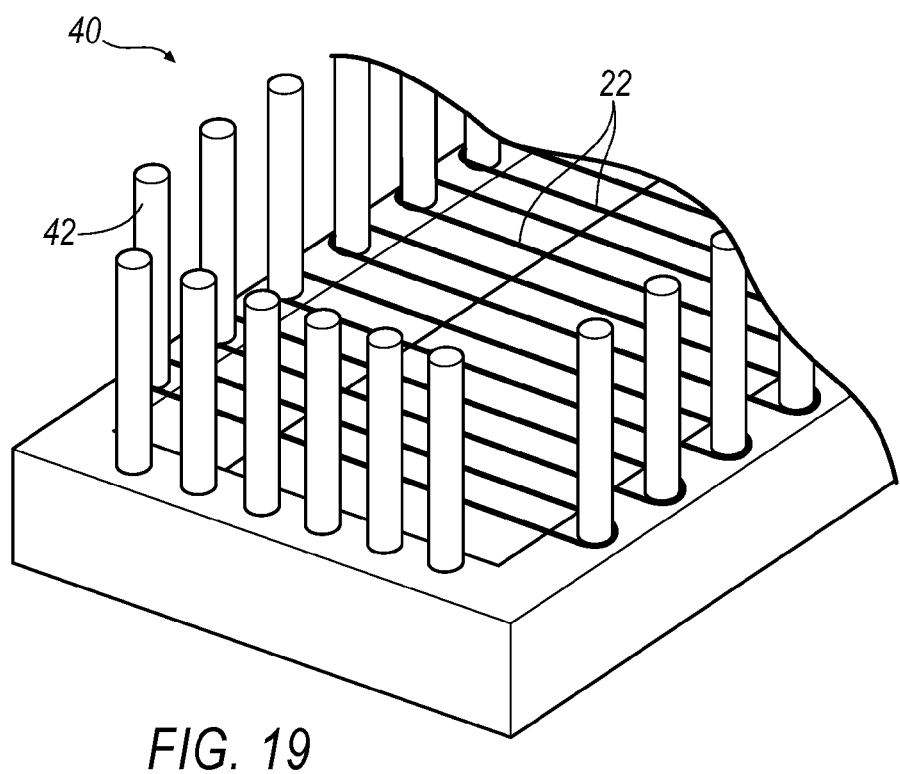
FIG. 19 is a top perspective view of a frame for securing continuous fibers of the present invention.

As shown in FIG. 19, the continuous fibers 22 may be assembled on a peg board or frame 40 having wrapping pegs 42 to keep their shape and alignment as is known in various industries. Alternatively, the continuous fibers 22 may be held in shape by impregnating the fibers with resin 52 to form a fiber mat or skin 50 as shown in FIG. 20 as is also well known in the art. As before, the particular resin is not material to this invention and will depend on the particular use for the composite. The skin 50 may be, for example, a visible Class A surface or a hidden structural pattern. Other methods may also be used to create the fiber pattern. One other method is pulling the fiber from a spool to a fixed point, plus through a wet out process or point to point.

As with the core, the particular fiber material is not important and can be made out of any suitable material which will depend largely on the particular application. Known fiber materials include, without limitation, fiber glass, carbon, polyamide, graphite, Kevlar, and metal.

An advantage of this invention is due to the at least one continuous fiber 22 being aligned with and secured to least one end wall 12 to form a composite 30 as shown in FIG. 18. The continuous fiber 22 can be secured to the core 10 using any known method such as adhesive or heat or may be integrally formed together as described below. The space 32 between the end walls 12 is essentially void of any fibers other than stray fibers or slight misalignment. An intent of this invention is to intentionally place the continuous fibers 22 over the end walls 12 to optimize structural strength and to avoid placing costly fibers over areas, such as space 32, to minimize expense and keep the weight down.

To further improve the strength of the composite, the continuous fibers 22 of the present invention can be tensioned either before securing them to the core 10 or while securing them to the core 10. Taking care to make certain that the fiber reinforcements are taut in a composite product to help them obtain increased performance is well known in the art. The continuous fibers can be pretensioned by, for example, tightly wrapping the fibers around the pegs 42 of the frame 40 using known methods or using one of the manufacturing processes described below.

The composite 30 may be further improved by providing continuous fibers 22 on the bottom face 18 of the core thereby having continuous fibers on the top 16 and bottom 18 faces of the composite using the methods described in this application. An example of a two-sided reinforced composite is depicted in FIG. 18.

Figure 22:
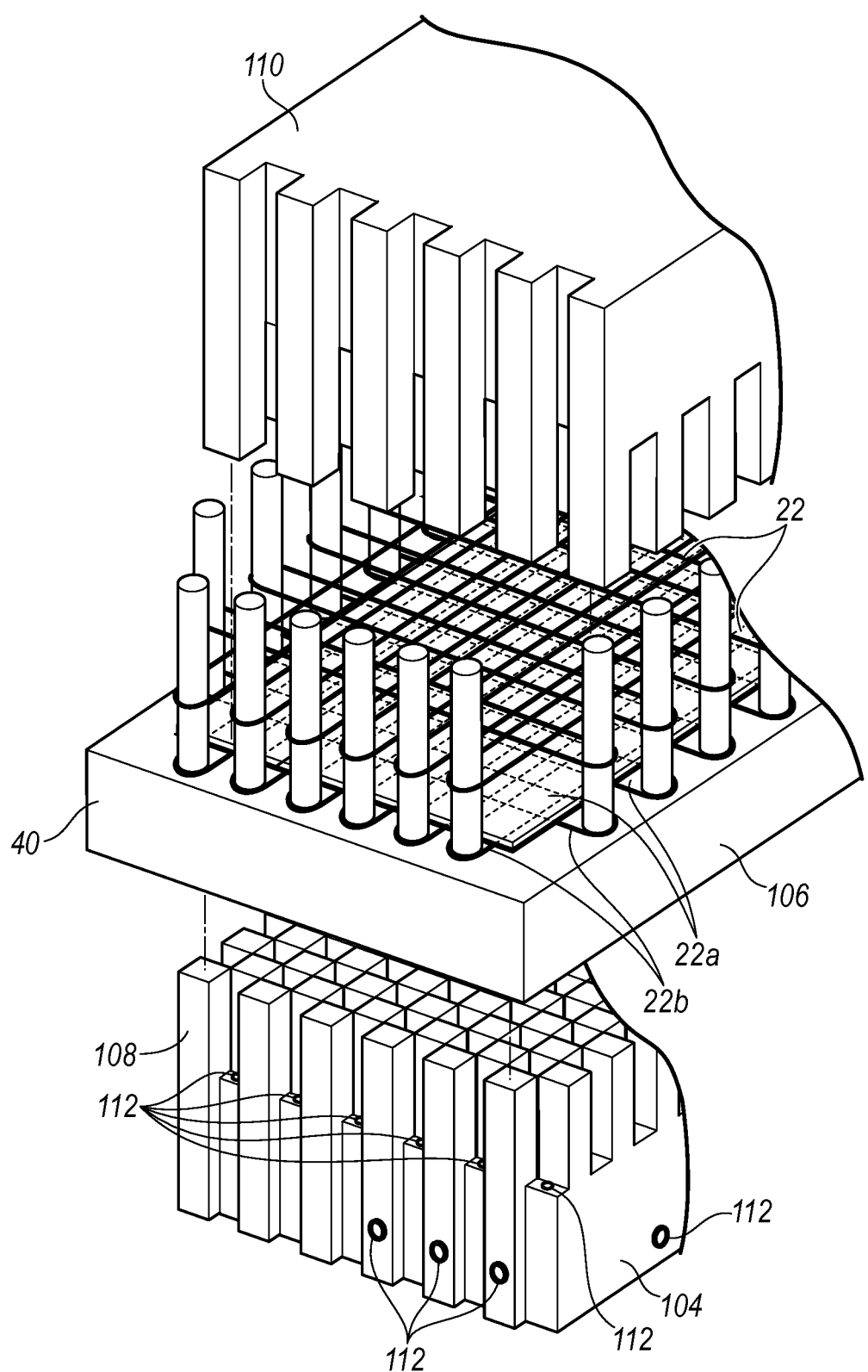
FIG. 22 is a top perspective view of a mold for manufacturing the composite of the present invention.
Figure 23:
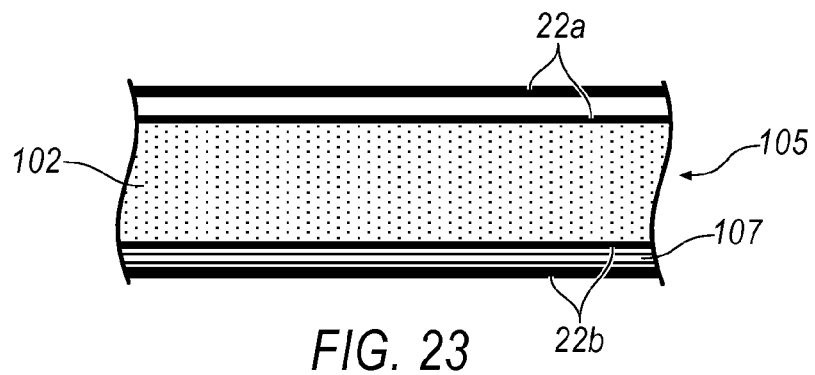
FIG. 23 is a side view of a composite of the present invention.

The composite 30 can be manufactured using any of multiple methods. For example, the composite may be manufactured using a molding process as shown in the flow chart in FIG. 21A and using the apparatus depicted in FIG. 22. A side view of the sandwich 105 is shown in FIG. 23. In this process shown first in Step 125, flowable material 102 is sandwiched between upper fibers 22a and lower fibers 22b on a frame 40. The sandwich 105 is made by first layering continuous fibers 22b on the frame 40. A film 107 may be placed between or on top of the continuous fibers 22b to create support for the flowable material 102. The flowable material 102 may include material such as resin pellets, powder, liquid, slurry, wood pulp, chopped material or one of other well known sources of flowable material which when heated and/or compressed form a flowable mass. Additionally, the flowable material may be a softened polymer or any material previously discussed. The film may be made out of any material that will support the flowable material that may conform to the shape of the mold. Examples include polymers, metals, composites, wood, and cardboard.

Flowable material 102 is then placed on top of the fibers 22b or film 107 and a second layer of continuous fibers 22a is created on top of the flowable material 102. The frame 40 is then oriented such that the fibers are oriented proximate the structures 108 that will form at least one of the end walls 12. The flowable material 102 may be heated, compressed diluted by solvent or any other known process to facilitate forming. In step 140, the flowable material 102 is allowed to solidify and the composite 30 is then removed from the mold.

Alternatively, flowable material 102 may be inserted into a first mold half 104 having a predetermined shape 106 corresponding to the predetermined shape 31 of the finished article and structure 108 to create a core having end walls as described in alternate Step 100 shown in FIG. 21B. The term "into the first mold" half also encompasses the term "onto the first mold half" as some materials may sink into the mold half while other materials may rest on the mold half. In the alternative path Step 120, Continuous fibers 22 are then oriented proximate the structures 108 that will form at least one of the end walls 12 either using a frame 40, a fiber mat 50, or simply layering the fibers where the end walls would be created. The flowable material 102 is allowed to solidify and the composite 30 is then removed from the mold.

In a compression molding process, a second mold half 110 would having a shape corresponding with the first mold half 104 would squeeze the flowable material 102 and maintain a pressure while the material solidifies as shown in step 160.

In a vacuum assisted molding process, vacuum ports 112 in the first mold half 104 would create negative pressure which would assist the flowable material 102 filling out the first mold half as is known in the art.

The continuous fibers 22 may also be placed in tension before being placed in the mold half or may be tensioned as a result of the molding process where in the continuous fibers are stretched to conform to the predetermined shape.

Figure 24:
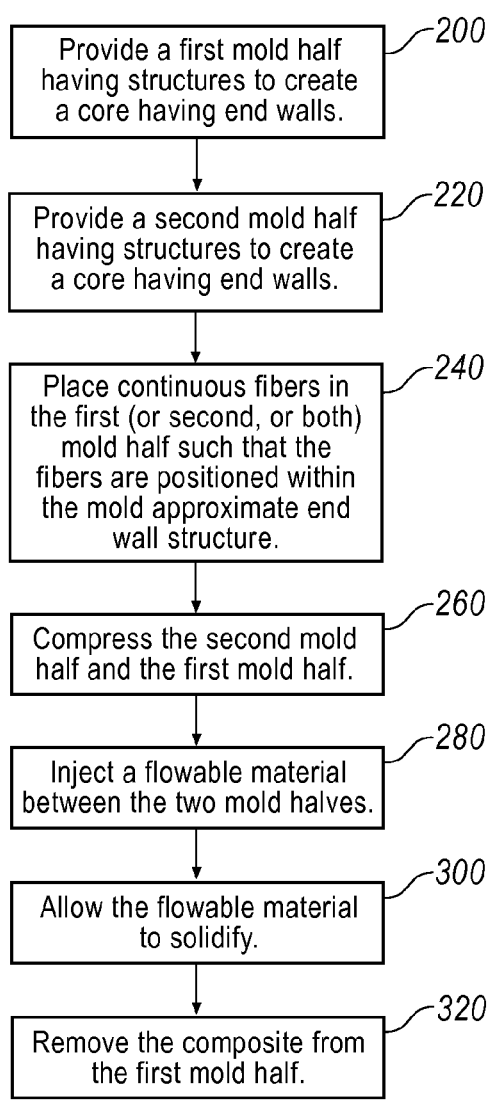
FIG. 24 is a flow chart of another molding process of the present invention.
Figure 25:
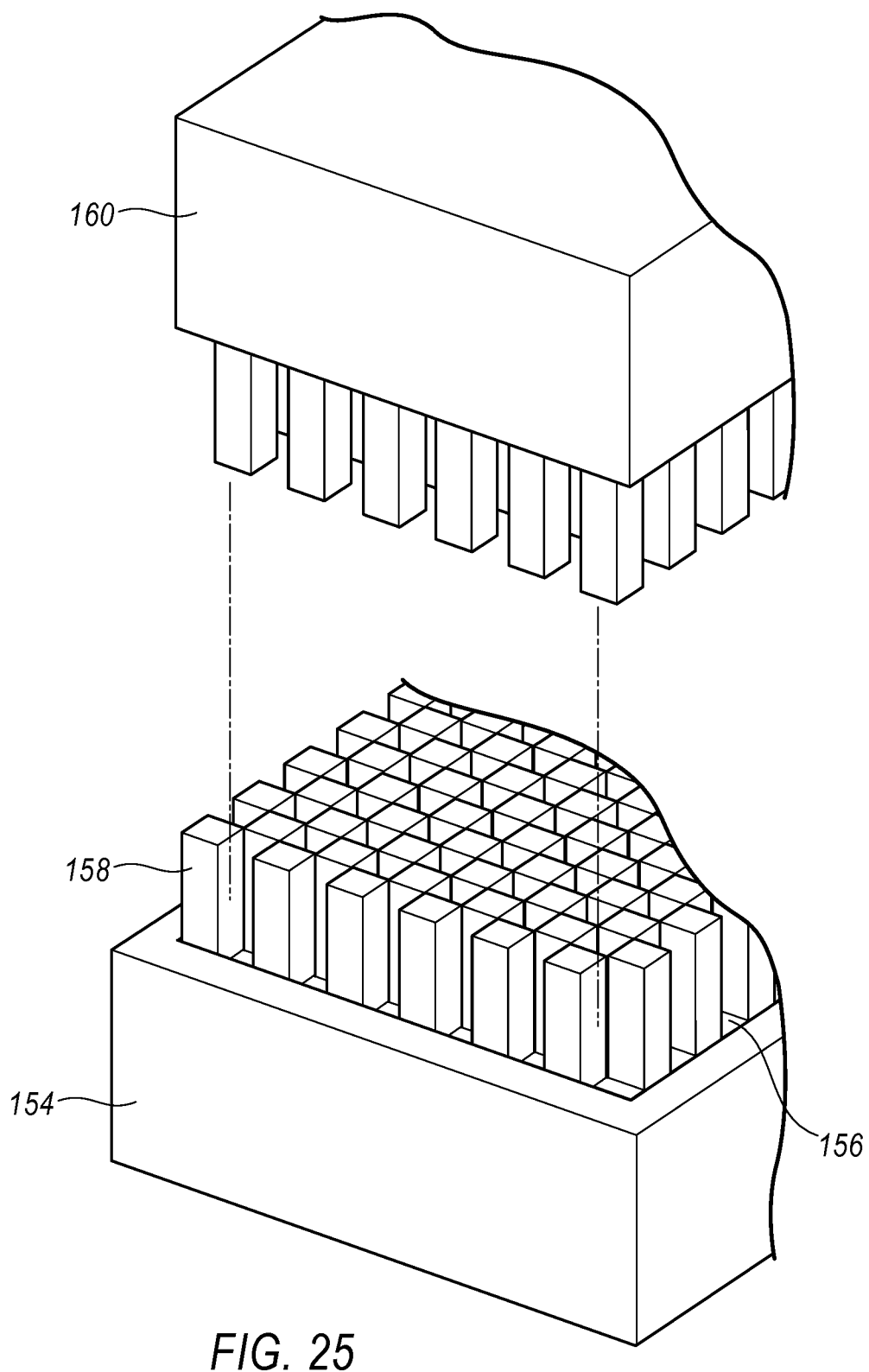
FIG. 25 is a top perspective view of another mold for manufacturing the composite of the present invention.

The composite 30 may also be formed using an injection molding process depicted in flow chart form in FIG. 24 and using the apparatus depicted in FIG. 25. In step 200, a first mold half 154 having structures 158 to create end walls is provided. The first mold half 154 has a cavity in a predetermined shape 156 corresponding to the desired final shape of the composite 30. In step 220, a second mold half 160 having corresponding structures to create end walls and a corresponding cavity having a predetermined shape is provided. As illustrated in step 240, continuous fibers are placed in a mold half 154 or 160 or between the mold halves 154, 160 using a frame 40 as depicted in FIG. 22 or as a self supporting perform as described above. The mold halves 154, 160 compress together in step 260 and flowable material (not shown) is injected into the mold halves in step 280 as is well known in the art. In step 300, the flowable 102 material is allowed to solidify and lastly, in step 320 the composite is removed from the mold halves.

Alternatively, the core may be separately manufactured using other processes and continuous fibers 22 or fiber mat 50 may be secured to the core 10 using known methods such as adhesive or heat in a subsequent operation.

The continuous fibers 22 may be impregnated within a resin to form a skin. If the continuous fibers 22 are in a bi-axial pattern, the skin may resemble a screen. The skin may already be formed in a shape corresponding to the predetermined shape of a first mold half 104 or 154. Alternatively, the continuous fibers may be in frame.

The continuous fibers may also be places in tension before being placed in a mold half or may be tensioned as a result of the molding process where in the continuous fibers are made taut to conform to the predetermined shape 31.

Figure 26:
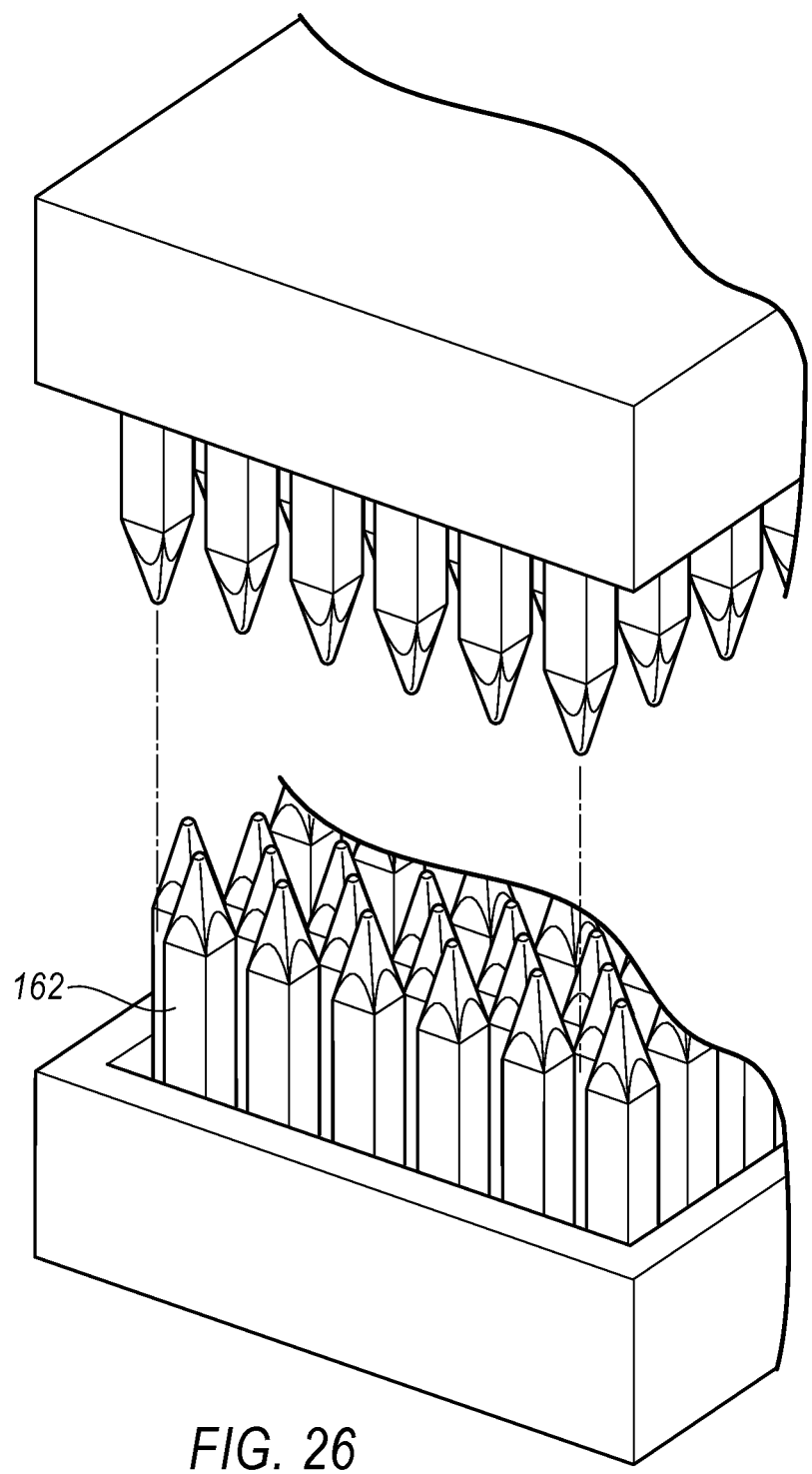
FIG. 26 is a top perspective view of another mold for manufacturing the composite of the present invention.

FIGS. 22 and 25 depict a mold having squared off projections. Alternatively, the mold may have pointed projections as shown in FIG. 26. In operation, when closing, the mold may pierce some of the material and cause the material to flow around the pointed projections. The term flowable also covers these instances wherein the flow may occur at slow speeds, when the material is being compressed, or in forging like operations.

In a preferred embodiment, the end walls of the core are arranged in a bi-axial pattern spaced apart by a distance of 9 mm. The core is manufactured out of polypropylene. The continuous fibers are made out of fiberglass and impregnated with polypropylene. The continuous fibers are also in a bi-axial and spaced apart by a similar distance of 9 mm. The composite is manufactured using a compression molding process wherein the resin temperature is approximately 300 to 500 degrees Fahrenheit and the mold temperature is approximately 150 to 300 degrees Fahrenheit.

While specific embodiments are presented, various modifications will become apparent to one of ordinary skill in the art without departing from the scope and spirit of the invention as set forth in the appended claims.

What is claimed as new and desired to be protected by Letters Patent of the United States is:

1. A composite comprising:
   an open ended core having a top and bottom surface, each surface having an end wall and wherein the core has a core pattern; and
   at least one continuous fiber;
   wherein at least one continuous fiber is oriented along at least one end wall of the open ended core and secured to the open ended core; and
   wherein the space between top and bottom surfaces of the end walls and the space between the core pattern are substantially void of resin impregnated fibers.

2. The composite of claim 1 wherein there are multiple continuous fibers and multiple end walls, and the multiple continuous fibers form a screen wherein the multiple continuous fibers are oriented over the multiple end walls.

3. The composite of claim 2 wherein the multiple continuous fibers in the screen are in tension prior to being secured to the core.

4. The composite of claim 2 wherein the multiple continuous fibers are impregnated within a resin before being secured to the open ended core.

5. The composite of claim 2 having a second set of end walls opposite the first set of end walls and a second set of continuous fibers are oriented along the second set of end walls.

6. The composite of claim 1 wherein the at least one continuous fiber is secured to the core while the continuous fiber is in tension.

7. The composite of claim 1 wherein at least one continuous fiber is impregnated within a resin before secured to the open ended core.

8. The composite of claim 1 wherein the open ended core has a biaxial pattern.

9. The composite of claim 1 wherein the open ended core has a tri-axial pattern.

10. The composite of claim 1 wherein the open ended core has a quadra-axial pattern.

11. A composite comprising:
    an open ended cellular core having a top surface and a bottom surface, the open ended cellular core also having end walls in a biaxial pattern;
    a skin having resin impregnated continuous fibers oriented in a biaxial grid pattern, the skin being secured to the open ended cellular core;
    wherein the impregnated continuous fibers are substantially aligned with the open ended cellular core when the skin is secured to the open ended cellular core; and
    wherein the space between the top and bottom surfaces of the end walls and the space between the biaxial pattern are substantially void of resin impregnated fibers.

12. The composite of claim 11 wherein the resin impregnated continuous fibers are placed in tension prior to being formed into the skin.

* * * * *